Figure 1:
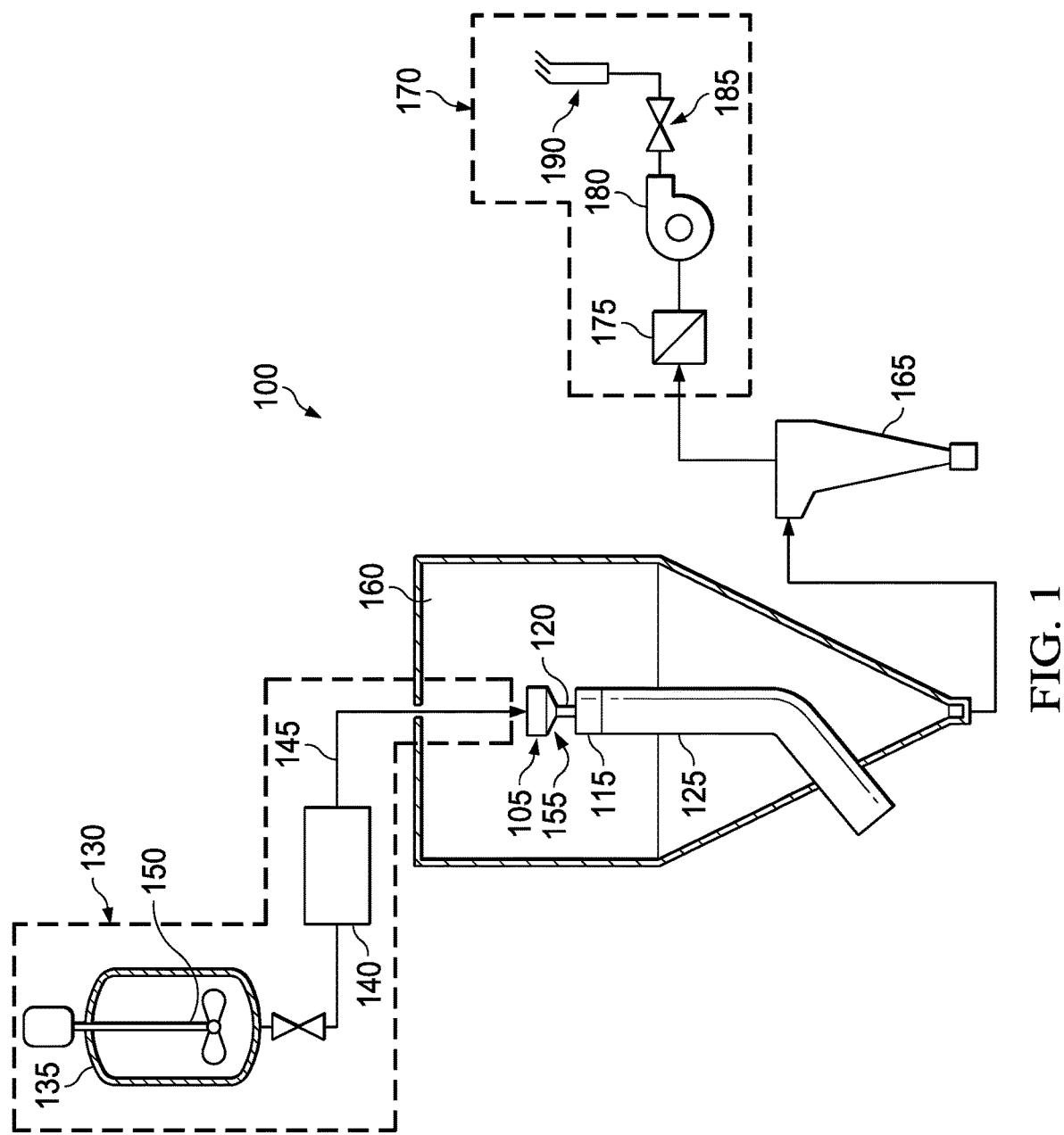

US010695733B2

(12) United States Patent
Zwiener et al.

(10) Patent No.: US 10,695,733 B2
(45) Date of Patent: Jun. 30, 2020

(54) MULTI-DISK SPINNING DISK ASSEMBLY FOR ATOMIZATION AND ENCAPSULATION WITH SPACING DISKS FOR ADJUSTING EXIT GAP

(71) Applicant: Southwest Research Institute, San Antonio, TX (US)

(72) Inventors: Albert M. Zwiener, Helotes, TX (US); Darren E. Barlow, Floresville, TX (US); Mark R. Heistand, San Antonio, TX (US); George T. Lamberson, San Antonio, TX (US); Jeffrey N. Harris, San Antonio, TX (US)

(73) Assignee: Southwest Research Intitute, San Antonio, TX (US)

( * ) Notice: Subject to any disclaimer, the term of this patent is extended or adjusted under 35 U.S.C. 154(b) by 0 days.

(21) Appl. No.: 15/917,769

(22) Filed: Mar. 11, 2018

(65) Prior Publication Data

US 2018/0207602 A1 Jul. 26, 2018

Related U.S. Application Data

(63) Continuation-in-part of application No. 14/752,420, filed on Jun. 26, 2015, now abandoned.

(51) Int. Cl.
*B05B 3/10* (2006.01)
*B01J 13/04* (2006.01)

(52) U.S. Cl.
CPC ............ *B01J 13/04* (2013.01); *B05B 3/1014* (2013.01); *B05B 3/1064* (2013.01)

(58) Field of Classification Search
CPC ... B05B 5/0407; B05B 3/1064; B05B 3/1014; B05B 3/1007; B05B 5/04; B05B 5/0403; B01J 13/04
USPC .................................... 239/223, 224, 222.11
See application file for complete search history.

(56) References Cited

U.S. PATENT DOCUMENTS 1,506,226 A * 8/1924 Dick ........................ B01D 1/20 239/224
3,346,192 A * 10/1967 Hege ........................ B05B 3/08 239/223
4,148,932 A * 4/1979 Tada .................... B05B 5/0407 239/3
4,698,156 A * 10/1987 Bumpers ................ B01D 33/21 210/331
7,150,414 B2 * 12/2006 Goldin .................... B05B 3/085 239/223

* cited by examiner

*Primary Examiner* — Jason J Boeckmann
(74) *Attorney, Agent, or Firm* — Livingston Law Firm

(57) ABSTRACT

A multi-disk spinning disk assembly for atomization and encapsulation applications. A number of patterned disks are stacked to form a disk stack having a feed well in the center core of the stack. Each patterned disk has channels defined by spacers, with the channels and spacers being of varying depths, heights, and/or widths. The fluid to be atomized or encapsulated is delivered to the feed well. The fluid then flows into the channels, which communicate the fluid toward the outer edges of the disks. The fluid exits the disk stack from a circumferential gap, which is created by interposing spacing disks between the patterned disks.

8 Claims, 12 Drawing Sheets

MULTI-DISK SPINNING DISK ASSEMBLY FOR ATOMIZATION AND ENCAPSULATION WITH SPACING DISKS FOR ADJUSTING EXIT GAP

RELATED APPLICATION

This patent application is a continuation-in-part of U.S. application. Ser. No. 14/752,420, filed Jun. 26, 2015, entitled Multi-Disk Spinning Disk Assembly for Atomization and Encapsulation.

TECHNICAL FIELD OF THE INVENTION

This invention relates to atomization and encapsulation equipment, and more particularly to such equipment that uses spinning disks.

BACKGROUND OF THE INVENTION

Micro-encapsulation is a process in which tiny particles or droplets are surrounded by a coating to result in tiny capsules. Micro-encapsulation may be used to encapsulate food ingredients, enzymes, cells or a vast number of other materials on a micro scale.

There are a number of different micro-encapsulation techniques. These can be broadly categorized as either physical or chemical processes. One type of physical process is referred to as "spinning disk" encapsulation.

The spinning disk encapsulation process uses a disk that rotates at high speeds, driven by a motor or other drive equipment. A spray is created by passing a fluid across or through the rotating disk. Centrifugal energy translates the fluid into a fine horizontal droplet spray.

The spinning disk process may be used for other types of atomization in addition to encapsulation. Numerous improvements to spinning disk atomizers (and encapsulators) have been made. A drawback of single disk atomizers is that the amount of liquid passing through the flow area is small. To obtain higher throughput, one improvement has been the use of multi-layered disks.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates an example of a spinning disk system.

FIG. 2 is a cross sectional view of one embodiment of a spinning disk assembly.

FIG. 3 illustrates one embodiment of the disk stack of FIG. 2.

FIG. 3A is a top plan view of a spacer and channels from the disk stack of FIG. 3.

FIG. 4 is an isometric view of a portion of another embodiment of a disk stack.

FIG. 5 is a top plan view along section A-A of FIG. 2.

FIG. 6 is a detailed view of spacers and channels.

FIG. 7 illustrates an alternative view of spacers and channels.

FIG. 8 illustrates an alternative embodiment of a disk for a multi-disk stack.

FIG. 9 illustrates a multi-disk assembly, using the patterned disks of FIG. 8, with interspersed gap spacing disks.

FIG. 10 illustrates the feed flow for the disk assembly of FIG. 9.

FIG. 11 illustrates a single disk assembly, having a disk and disk cover with a circumferential slit.

FIG. 12 illustrates one of the gap spacing disks of FIG. 9.

DETAILED DESCRIPTION OF THE INVENTION

The following description is directed to improved spinning disk equipment and methods for atomization and encapsulation. Spinning disks used for these applications are sometimes more generally referred to as a type of centrifugal atomizer.

Atomizer System Overview

FIG. 1 depicts an example of a spinning disk system 100, which has a multi-disk spinning disk assembly 105. The system has a "bottom-mount" configuration, that is, the drive shaft that enables the spinning motion is located beneath the disks. In "top mount" systems, the disk assembly 105 may be driven from the top, such as in conventional rotary atomizers used for spray drying and prilling.

Spinning disk assembly 105 is coupled to a drive motor 115 by connecting rod 120. As an alternative to drive motor 115 mounted inside chamber 160, motor 115 may be replaced by a bearing assembly, which is driven by a motor located outside chamber 160 and a flexible drive shaft routed through motor mounting frame 125.

Various embodiments of assembly 105 are described herein, and it should be understood that these embodiments could be used in either a bottom-mount or top-mount system, and with various drive motor configurations.

Spinning disk assembly 105 is typically substantially cylindrical. A typical range of diameter sizes of spinning disk assembly 105 is between about 10 mm and about 300 mm. As will be described in greater detail below, spinning disk assembly 105 comprises a stack of disks separated by spacers. The spacers have special channels to receive feed fluid and to achieve a desired flow onto the disk peripheries.

Drive motor 115 is supported within spinning disk apparatus 100 by a motor mounting frame 125. Motor 115, which may be driven hydraulically, pneumatically or electrically, is operable to rotate spinning disk assembly 105 via connecting rod 120. Motor 115 includes a speed control system operable to rotate spinning disk assembly 105 at various speeds.

Spinning disk apparatus 100 also includes a fluid feed delivery system 130, which typically has one or more feed containers 135, one or more pumps 140, and a fluid delivery system 145. As an alternative to a pump, fluid may be fed to the disk assembly 105 via pressurization of feed container 135 and/or by gravity. Fluid delivery system 145 typically comprises a tube through which the materials to be processed by disk apparatus 100 are introduced onto spinning disk assembly 105. Feed container 135 may have an agitation means 150, such as a stirrer, to facilitate mixing of materials.

For use with feeds that are molten or thermally gellable, proximate spinning disk assembly 105 is a heater 155, which may be in contact with or integral to spinning disk assembly 105 as shown, or alternatively, located in close, non-contacting proximity thereto. Heater 155 may be located above and/or below disk assembly 105. Suitable heaters 155 include, but are not limited to, capacitance heaters, impedance heaters, liquid circulation heaters, hot air guns, and the like.

Spinning disk apparatus 100 includes a process chamber 160, which seals a space surrounding spinning disk assembly 105. Chamber 160 is typically connected to a gas source (not shown) to maintain the environment within process chamber 160 under a controlled atmosphere. Process chamber 160 may optionally include a vacuum source (not shown) adapted to control the pressure within process chamber 160. The gaseous environment maintained within process chamber 160 may comprise air or some inert gas or gases which are supplied to the process chamber 160 by a gas feed means (not shown). Process chamber 160 may comprise internal surfaces designed for characteristics such as thermal control or thermal conductivity.

Spinning disk apparatus 100 can further include a product collection system 165, as well as an evacuation system 170, which can include one or more filters 175, one or more blowers 180, one or more air flow control valves 185, and one or more vents 190.

Multi-Disk Atomizers

Figure 2:
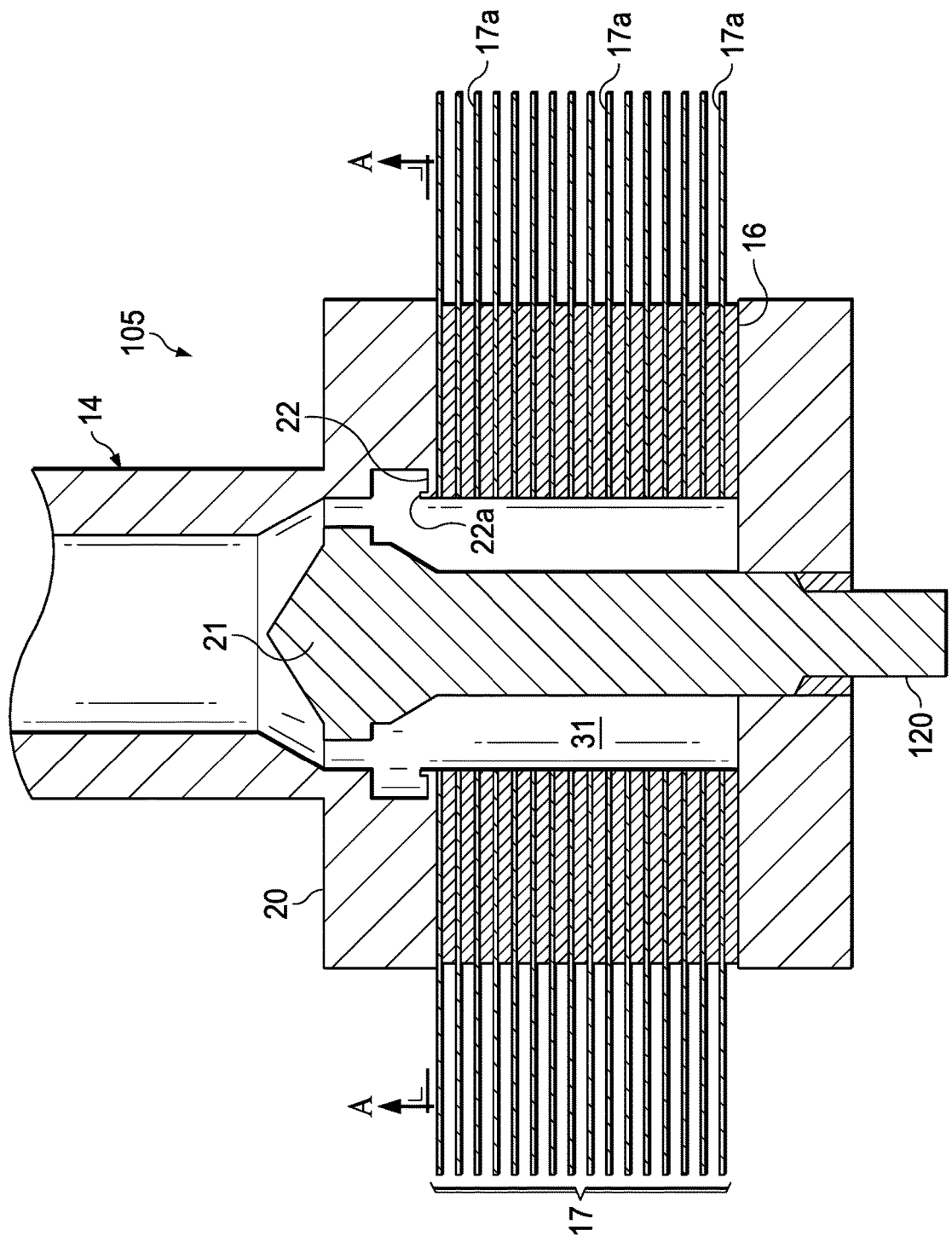

FIG. 2 is a cross sectional view of one embodiment of spinning disk assembly 105, which is configured for a top-mount system spinning disk system. An insulated housing 20 is generally cylindrical in shape. A hollow shaft 14 delivers the liquid feed material to the hollow core of housing 20, and provides a drive connection for the motor. Shaft 14 and housing 20 comprise an assembly such that they rotate at the same speed.

Housing 20 supports the top and bottom of a stack of disks 17. Housing 20 is typically closed at its ends, other than an opening for fluid intake, and is typically insulated.

Disk stack 17 comprises a number of disks 17a, which are uniform in shape and size. Each disk 17a has an annular shape, that is, it is a flat round disk with an inner opening. The disks 17a are stacked one atop the other such that the inner openings are aligned and form an inner cylindrical feed well 31 within a core of housing 20.

In other embodiments, the disks 17a need not necessarily be uniform in shape or size. For example, the disk stack 17 might comprise a stack of disks having tapering diameters.

Spacers 16 between the disks have channels, not explicitly shown in FIG. 2, but described in detail below. As explained below, these spacers 16 and their channels provide communication of fluid from the feed well 31 to the peripheries of the disks 17a. As well as separating the disks 17a and providing fluid communication from feed well 31 toward the exterior edges of disk stack 17, spacers 16 provide mechanical support and integrity to the disk stack 17.

As further explained below, a "spacer" may be an integral portion of a disk, or equivalently, a "spacer" may be a separate piece of material inserted or otherwise installed between disks. In various embodiments, disks and spacers may be of the same or different materials. The disk stack can be a machined assembly. Disks can be made from thin foils, as thin as 0.03 inches or less. Or, the entire disk stack 17 could be a composite assembly made by stereo lithography or similar rapid prototyping techniques.

Feed shaft 14 delivers fluid into feed well 31 and rotates the disk assembly 105. In the embodiment of FIG. 2, the feed well 31 has an inner cone 21 extending upward from the bottom center of the feed well 31. The cone 21 has a sloped (conical) upper surface. The fluid drops onto the sloped surface of cone 21. This conical top surface of feed cone 21 provides tangential distribution of liquid before it spills into feed well 31.

Optionally, the inner diameter of feed well 31 may be slightly enlarged just below the cone-shaped top of feed cone 21, forming a shelf 22 at the top of the disk stack 17. This allows liquid to spill from cone 21 to the top of the disk stack 17. Because disk assembly 105 is rotating, this distribution of fluid onto the top of the disk stack 17 at shelf 22 is tangential. If desired a small lip 22a may be added to improve fluid distribution at low speeds.

Figure 3:
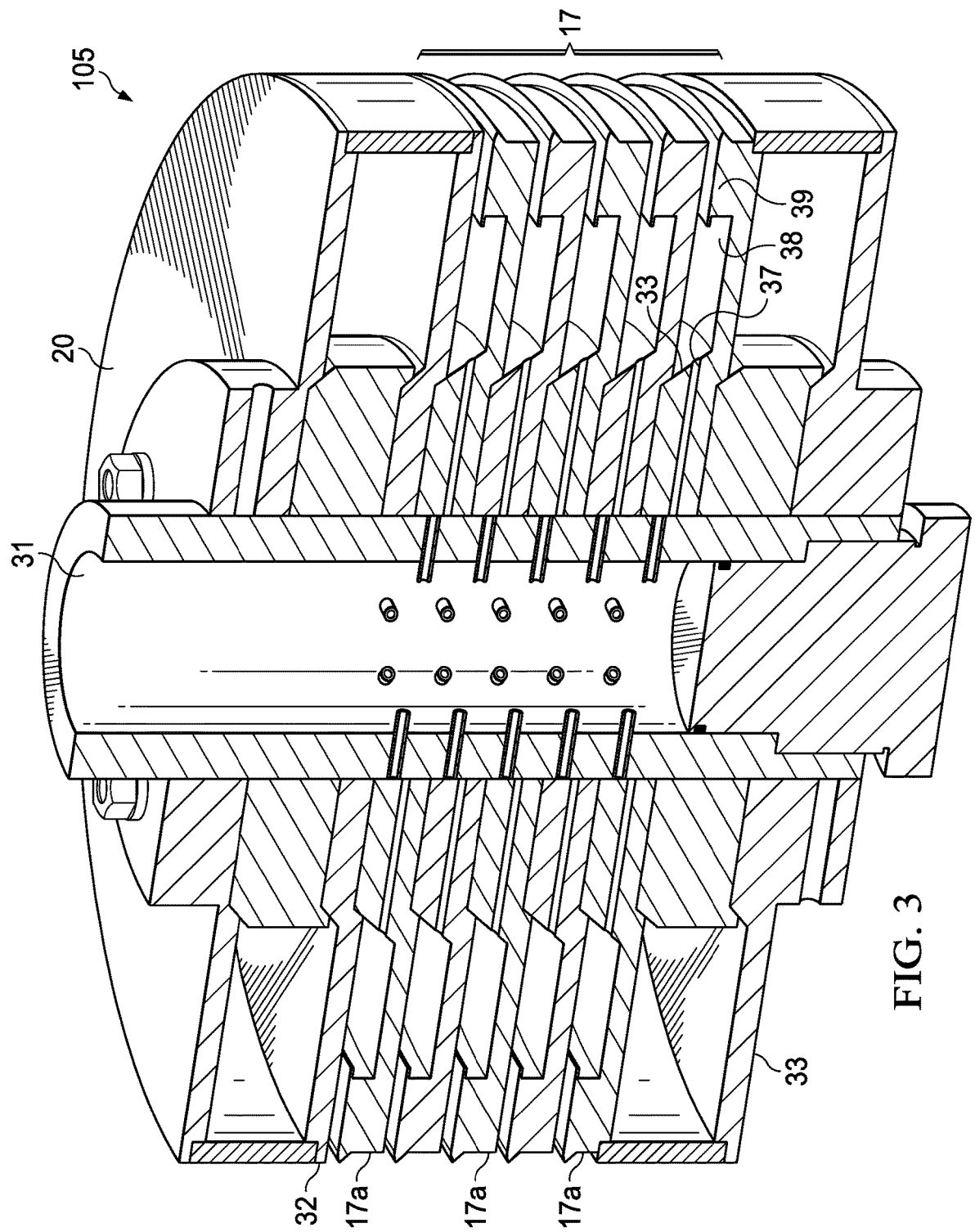

In other embodiments, such as the embodiment of FIG. 3, feed cone 21 and/or shelf 22 may be omitted and the fluid may drop directly into feed well 31. The rotation of the spinning disk assembly 105 causes the fluid to spread down and across the surface of the feed well.

From feed well 31, fluid enters channels in the spacers 16, which distribute fluid toward the periphery of the disks. After exiting the channels, fluid flows at least some distance on the flat surface of the disks. The flat surface of each disk between the channels and the edges of the disk provides distance for liquid discharging from the channels to acquiesce to the film thickness driven by fluid properties, flow rate, and disk speed. Empirically validated equations have been developed to represent the theoretical steady state film thickness of fully developed laminar flow on a spinning disk.

Disk Stacks for Multi-Disk Atomizers

FIG. 3 illustrates one embodiment of the disk stack 17 of FIG. 2. In the example of FIG. 3, disk stack 17 has five disks 17a.

Housing 20 has a top plate 32 and bottom flange 33. These define air gaps at the top and bottom of disk stack 17 for insulation purposes. These spaces could also be filled with insulating material. A feed well 31 receives fluid flow into its top end via feed shaft 14, and is configured as a hollow cylinder.

Each disk 17a has an annular spacer 33 that separates that disk 17a from the disk above. Each spacer 33 has a center opening that coincides with the openings of the disks 17a. However, the diameters of the spacers 33 are smaller than that of the disks. Thus, the diameters of spacers 33 do not extend the entire diameter of the disk stack 17. In the example of FIG. 3, the radius of the spacers 33 is about one-third to one-half the radius of the disks.

Each spacer 33 has at least one channel 37 that extends from the center opening of that spacer outward to the perimeter of that spacer 33. Each channel 37 provides fluid communication from the feed well 31, via an inlet opening of the channel 37, to the perimeter of the spacer, via an outlet opening of the channel 37. In the example of FIG. 3, the spacer channels 37 are substantially horizontal, relative to the horizontal plane of the disks.

The space between disks 17a past spacers 33 forms a circumferential groove 38 near, but not at, the outer perimeter of the disk 17a. A peripheral weir 39 around the periphery of each disk 17a interrupts groove 38, but allows passage of fluid outward from the outer edge of the disk, to further distribute fluid tangentially.

Referring to both FIGS. 2 and 3, in operation, as disk stack assembly 105 rotates, feed shaft 25 delivers fluid to the feed well 31, which distributes liquid tangentially around its inner surface. The spacer channels 37 open into the sides of the feed well 31. The spacer channels 37 communicate fluid to groove 38, where it is distributed to the periphery of the disks.

Figure 3A:
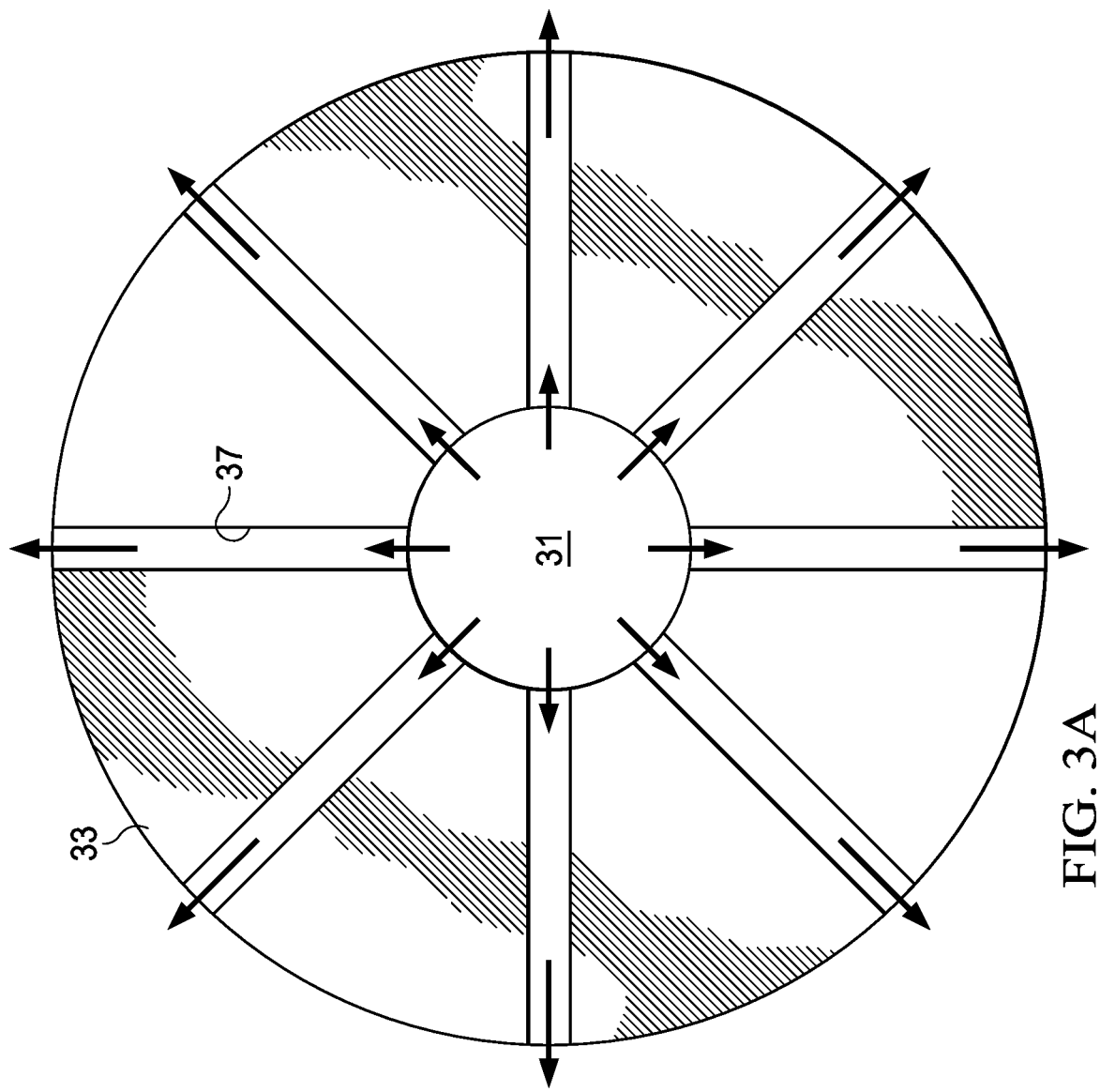

FIG. 3A is a top plan view of a spacer 33 and an example of its channels 37. Here, channels 37 are "spoke" type channels, extending horizontally and radially across or through spacer 33. As indicated by the arrows, fluid flows from feed well 31 radially outward through channels 37. The fluid then spills into groove 38 where it distributes around the outer circumference of the disk and is expelled from the disk perimeter.

In the example of FIG. 3A, channels 37 are the same geometry along their length; they are typically round but may have any closed geometry. They are generally horizontal, in a plane parallel to that of the disks. However, in other embodiments, the channels could be of varying geometry along their length, such as by becoming narrower or wider toward the end away from the feed well 31. Also, in other embodiments, the channels could be slanted up or down, relative to the plane of the disks, within their associated spacer. Further, the channels may change in shape and/or aspect ratio, for example, by becoming taller or shorter along their length.

The text below accompanying FIGS. 4-6 describes an embodiment of a disk stack 17 having spacers with channels, similar to FIG. 3. However, in FIGS. 4-6, the channels are of varying dimensions along their length, in a geometry designed for optimal fluid distribution.

Figure 4:
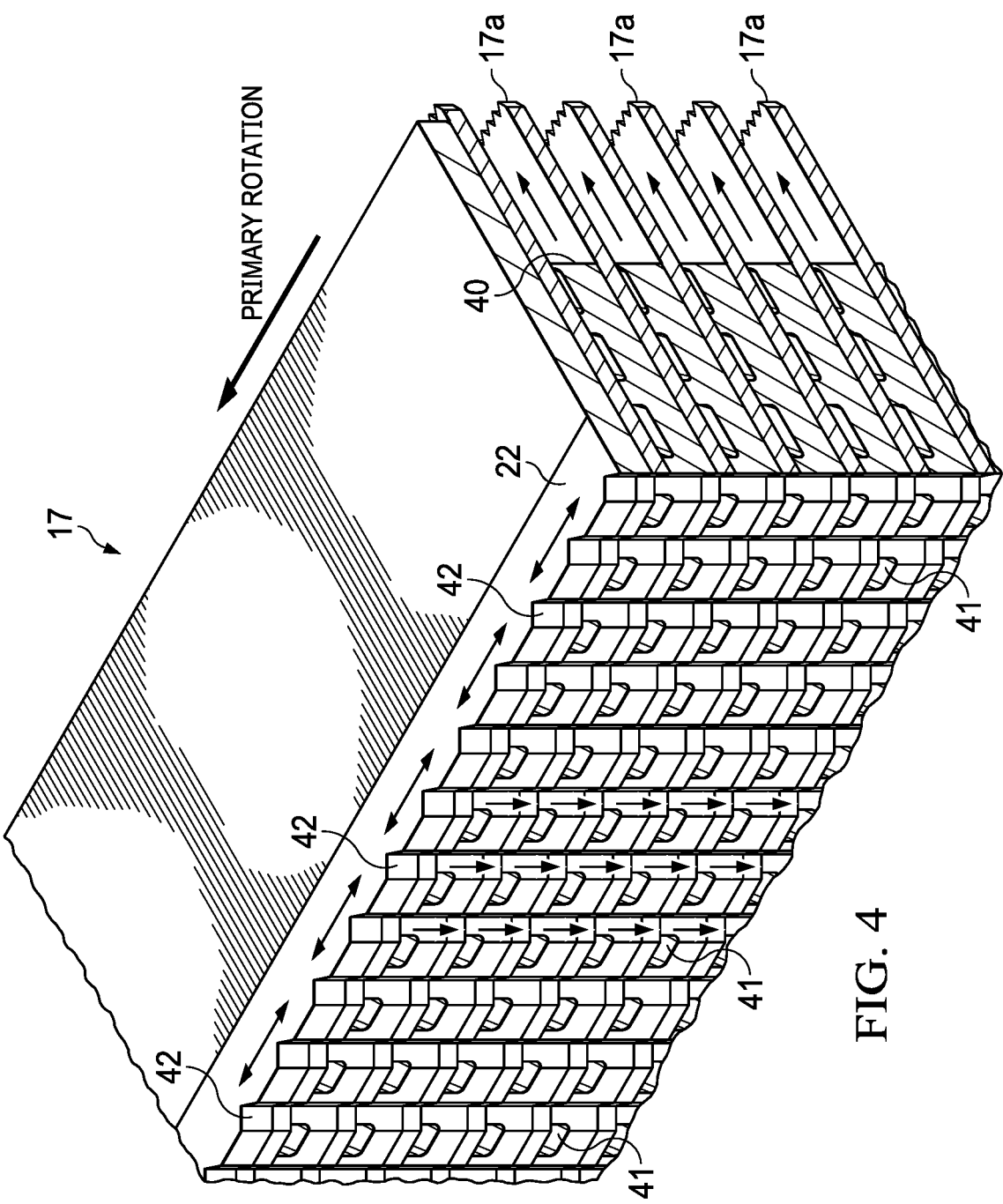

FIG. 4 is an isometric view of a portion of another embodiment of a multi-disk stack, such as stack 17. The view of FIG. 4 is sectioned at the bottom of a feed well 31. Feed well 31 may be configured like the feed well 31 of either FIG. 2 or 3. An example of a suitable thickness of each disk 17a is 0.03" thick.

Disk stack 17 has spacers 40, one spacer 40 between each pair of adjacent disks 17a. The spacers 40 extend radially outward from feed well 31 for a portion of the radial distance of the disks. In the example of FIG. 4, each spacer 40 extends radially outward about half the radial length of the disks.

Each spacer 40 has a number of channels 41 that provide liquid flow from feed well 31, past the outer edge of the spacer, to the underside of the disk above the spacer 17a. In other embodiments, the liquid flow could be toward the upper surface of the disk below the spacer.

The arrows indicate the path of the liquid feed material. It is to be understood that the spinning disk assembly 105 is rotating. As indicated, fluid first spills onto shelf 22 at the top of the disk stack 17 and distributes tangentially. The fluid then falls into vertical troughs 42. The communication of fluid from these vertical troughs 42, through the channels 41 in spacers 40, and to the perimeter of disks 17a is described in further detail below in connection with FIGS. 5 and 6.

In the example of FIG. 4, with vertical troughs 42, axially aligned flow on or within the inner surface of feed well 31 accomplishes disk-to-disk fluid distribution and circumvents localized Coriolis effects that tend to cause flow variation. In other embodiments, the feed delivery into channels 41 could be like that of FIG. 2 or 3. Feed fluid would drop into the feed well 31 and be distributed by rotation into the channels 41 without vertical troughs 42.

FIG. 4 further illustrates disks 17a having serrated (teethed) edges. These serrated edges can be formed on the disks of any of the embodiments of this description and help improve desired atomization and encapsulation characteristics.

Figure 5:
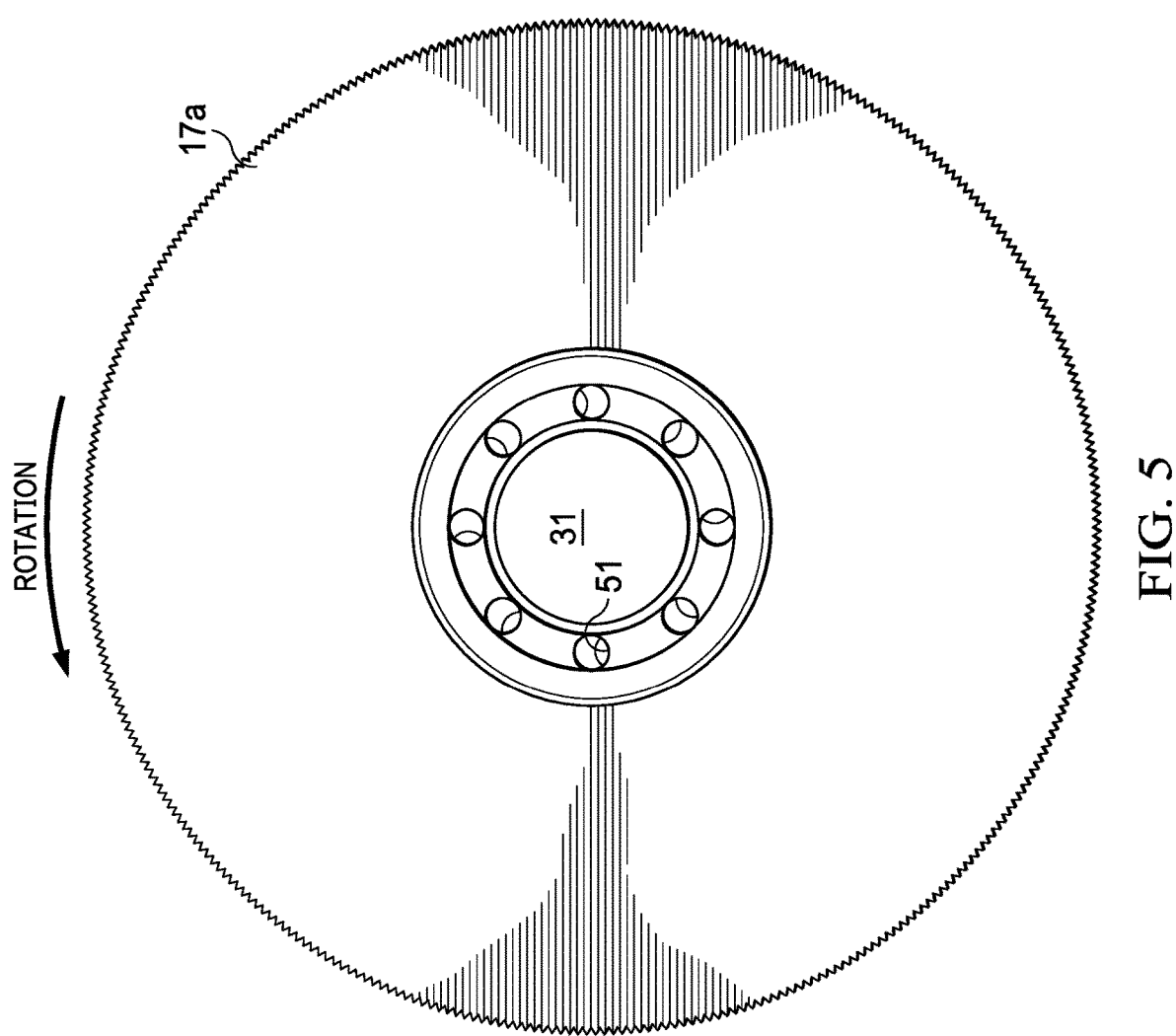

FIG. 5 is a top plan view of section A-A of FIG. 2 and illustrates one embodiment for delivering fluid into vertical troughs 42. The top surface of the top-most disk 17a is shown. The fluid that drops onto shelf 22 meets a plurality of openings 51 that communicate fluid flow into the disk stack 17. If desired, holes 51 can be angled. If angled toward the direction of rotation, holes 51 provide restriction for tangential distribution. If angled opposite the direction of rotation, holes 51 enhance fluid pumping. Referring again to FIG. 4, holes 51 may provide vertical fluid flow to the vertical troughs 42 at the inner well of the disk stack 17.

Figure 6:
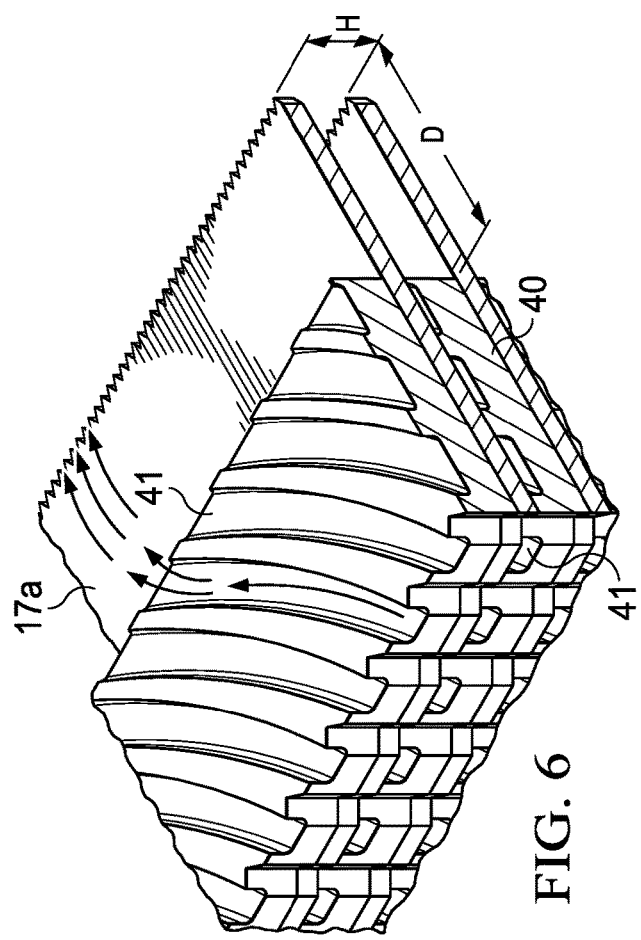

FIG. 6 is a detailed view of a spacer 40 and its channels 41. Each channel 41 is in fluid communication with fluid delivered to feed well 31. As its length goes from its inlet end to its outlet end (at the outer edge of spacer 40), each channel 41 widens and flattens. Adjacent channels 41 may widen to the extent that they merge to the same plane at the edge of the spacer 40 and at the underside of the disk above the spacer.

Fluid flow is indicated by arrows. Fluid enters channels 41 via the feed well 31 and into channels 41. Fluid flows through channels 41 onto the underside of the disk above the spacer 40. Each channel 41 begins with an approximately rectangular shape and ends with near-zero depth, merging with adjacent channels. In other words, the channels 41 are more narrow and deeper at their inlet ends and become more shallow and wider toward their outlet ends where they discharge fluid directly onto the surface of the disks.

This channel geometry acts to receive fluid from the feed well 31 into the channels 41, and re-shapes the fluid into a film-like geometry as the fluid transitions from the spacer 40 to the disk 17a. Furthermore, the use of variable depth and width fluid distribution channels 41 overcomes the need for substantial flow restriction to accomplish fluid distribution.

After the fluid exits channels 41, it traverses an additional radial distance over the disk surface. This allows any channel disturbance to dissipate and the liquid to consolidate into a film thickness. In alternative embodiments, the outer disk edge could be closer to, or the same as, the edge of spacer 40, in which case the liquid is atomized more quickly, or immediately.

The distance between the outer edge of the spacers 40 and the outer diameter of the disks 17a is referred to as D(periphery) in FIG. 6. A longer distance provides more space for the fluid to interact with the disk surface prior to atomization. A shorter distance reduces space for surface spreading and can be merely the size of the teeth.

The spacing, H, between disks 17a is designed to be sufficiently large to avoid over-flooding of the disk periphery. However, smaller spacing can be used to maintain flooding to the disk periphery under sufficiently low flow rates to avoid sheet break-up.

At their inlet ends, an example of a suitable channel dimension (for the example disk assembly of this description) is about 0.05 inches wide with a depth of about 0.02 inches. In general, these dimensions are easily scaled to accommodate fluids having various solid particles and viscosities. A typical range of channel inlet widths is 0.005 inches to 0.5 inches. A typical range of channel inlet depths is 0.005 inches to 0.25 inches. The aspect ratio of width to depth can vary. A useful range of dimensions for the vertical troughs 42 is 0.05 inches to 1 inch wide and 0.05 inches to 1 inch deep.

Figure 7:
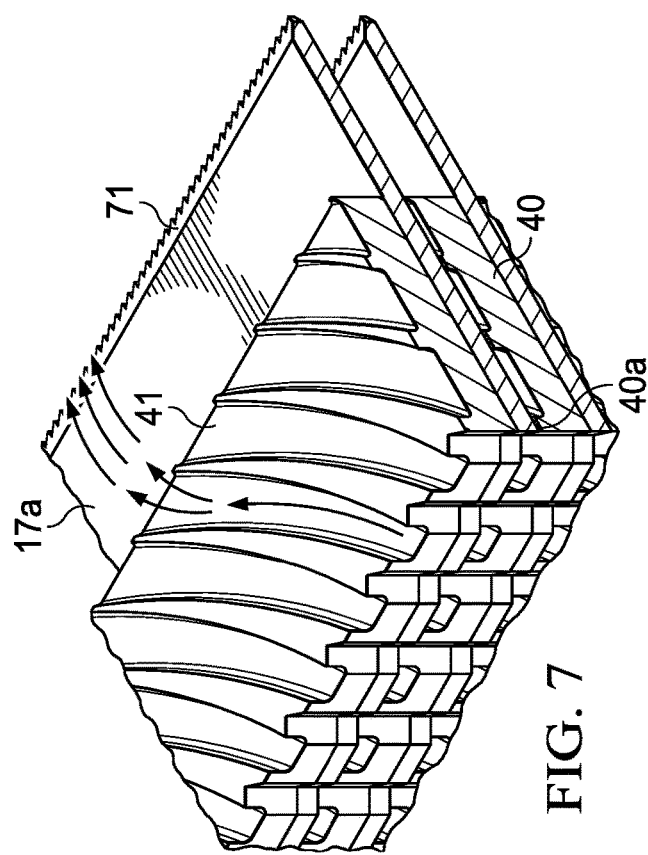

FIG. 7 illustrates an alternative embodiment of channels 41. Here, channels 41 decrease in depth from their inlet ends to zero depth at their outlet ends, merging with adjacent channels.

In this embodiment, an additional spacing disk 40A with a flat, sheet-like geometry is used to control the gap between the outlet end of spacer 40 and the adjacent disk 17a. Spacing disks 40A are constructed from a very thin material and control an annular gap between the spacer 40 and disk at the outer edge of the spacer 40. There is a spacing disk 40A under each disk 17a in a disk stack.

Spacing disks 40A have a diameter less than spacer 40 such that fluid communication from the channels 41 to the disk is maintained. An example of a suitable material for spacers 40A is shim stock. A range of suitable thicknesses may be from 0.001" to 0.07".

Spacing disks 40A can be easily exchanged for spacing disks 40A of varying thicknesses and diameters. In this manner, the use of spacers 40A provides a degree of freedom for controlling the size of an annular gap between disks, and thus for controlling liquid thickness flowing onto the disks. As a result, the disk assembly can adapt to various feed formulations and resultant fluid properties without re-manufacturing spacers with channels.

FIG. 7 also illustrates disk 17a having an outer perimeter edge 71 that is beveled as well as serrated.

In still other embodiments, the width of channels 41 could alternatively be constant. In the latter case, the channels would have a constant geometry along their length as in the channels 37 of FIG. 3.

Referring to FIGS. 2-7, in all embodiments, fluid distributes into a feed well 31. In some embodiments, fluid is encouraged into axially aligned troughs 42 in the feed well surface, which provide disk-to-disk fluid distribution. The fluid then flows into spacers (33, 40) between the disks 17a, and more specifically into spacer channels (37, 41) within or on the surface of the spacers. The channels (37, 41) communicate the fluid toward the outer edges of the disks 17a. The disk surface past the spacers (33, 40) can have various configurations, such as teeth, weirs, or flatness, designed for particular desired atomization or encapsulation characteristics.

It can be further understood that spacers 40 and disks 17a can be patterned from a single piece of material. Depending on the manufacturing technique, the spacers 40 with their channels could be patterned from a thick stock disk, or could be patterned by applying material to a thin stock disk. The spacers and channels could have any of the various configurations described above. For purposes of this description, an integrated disk with spacers and channels is equivalent to a disk with spacers and channels attached. Any of these configurations could use spacing disks, such as spacing disks 40A, to control the thickness of an annular gap between disks around their perimeters.

Disk Stack with Patterned Disks and Gap Spacing Disks

Figure 8:
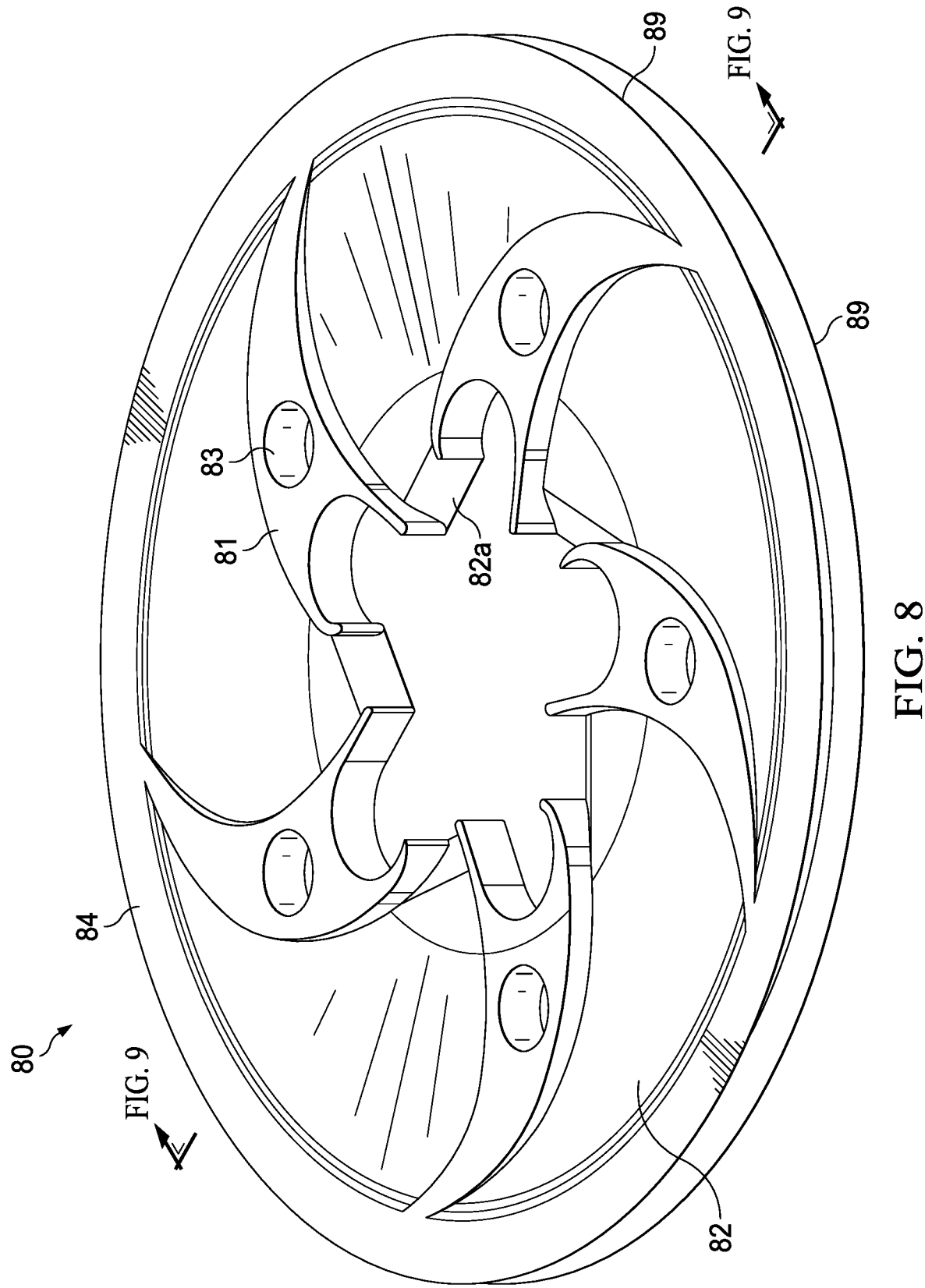

FIG. 8 illustrates an embodiment of a disk 80, suitable for use in a disk stack for a multi-disk assembly for an atomizer, such as the atomizers of FIGS. 1 and 2. The atomizer may be a top mount or bottom mount atomizer.

Like the various disks described above, disk 80 is a thin circular disk. Disk 80 has a center hole, which forms a feed well when multiple disks 80 are stacked.

Disk 80 is flat bottomed, but its upper surface is patterned to form spacers 81, channels 82 between the spacers 81, and an outer rim 84. Center hole is lobed, with the lobes being defined by the shape of spacers 81.

Thus, disk 80 is annular, with its middle portion comprising spacers 81 and channels 82 and its outer periphery having a rim 84. Disk 80 has a thickness and a radius.

The thickness of disk 80 varies due to the formation of spacers 81, channels 82, and rim 84, as described below. Depending on the manufacturing process, these elements (spacers, channels, and rim) can be described in terms of machining away layers of a thicker starting disk or adding layers to a thinner starting disk. Spacers 81 and rim 84 are herein described as having a "height" relative to the bottom surface of disk 80. Channels 82 are described as having a "depth" relative to the highest portion of spacers 81, which is also the maximum thickness of disk 80.

The height of spacers 81 is the same as the maximum thickness of disk 80. The height of spacers 81 is also the same as rim 84. As explained below, holes 83 are for assembly bolts.

With regard to spacer width, each spacer 81 has a curled geometry, and is also wider toward the center of disk 80 and narrower toward the periphery of disk 80. The portions of spacers 81 toward the center of disk 80 are cut-out, in a manner that will form lobes around the periphery of a feed well. The portions of spacers 81 toward the periphery of disk 80 are narrow, such that the distance between spacers 81 at the periphery of disk 80 is much greater than at toward the center of disk 80.

Spacers 81 are also curved, such that the arrangement of spacers 81 forms a "pinwheel" pattern, with "pinwheel" defined herein as being both curved and varying in width. In the example of FIG. 8, there are five spacers 81, but that number may vary.

Spacers 81 define channels 82 on the upper surface of each disk 80. Due to the shape of spacers 81, each channel 82 is narrower toward the center of disk 80 and wider toward the periphery of disk 80. Channels 82 are also curved. Channels 82 vary in depth, being deeper toward the center of disk 80 and shallower toward the periphery of disk 80. Each channel 82 has a ramp 82a into the feed well.

The outer periphery of disk 80 has a rim 84. Where rim 84 joins with spacers 81, rim 84 has a height that is the same as the height of spacers 81. At this height, rim 84 almost fills the gap between disks 80 when they are assembled in a stack. As explained below, a gap adjustment disk between each disk 80 creates a thin gap 96 above rim 84 and allows liquid to escape outwardly from the disk channels 82 when the disk assembly is spinning. Because spacers 81 join rim 84 at the same height, fluid between the disks 80 is circumferentially distributed and ready to exit gap 96 evenly around the circumference of disk 80. If desired, rim 84 may have a slight lift (increase in height) toward the outer edge of disk 80.

Figure 9:
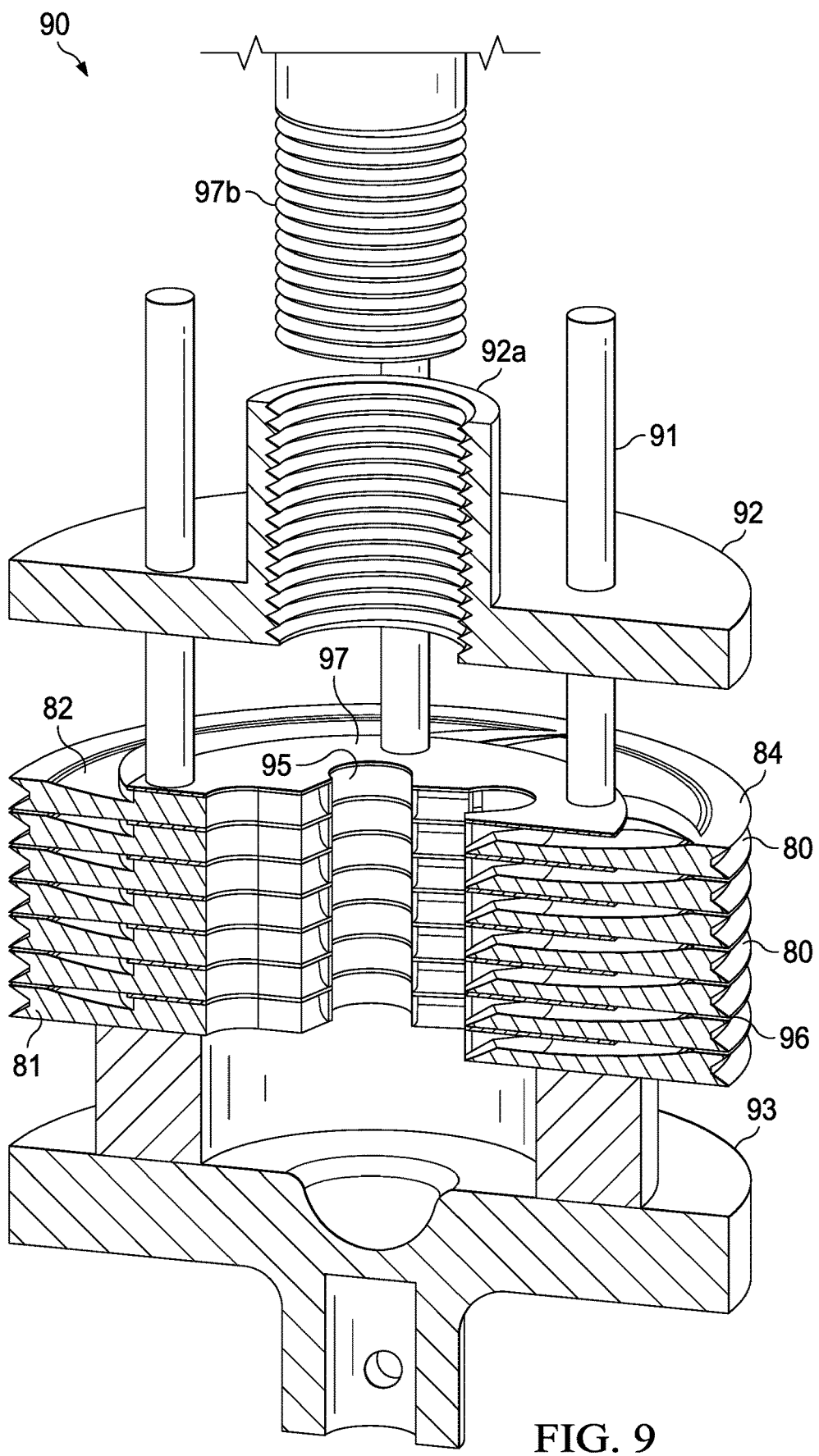

FIG. 9 is a perspective and sectional view of a disk assembly 90, having a stack of disks 80 configured as described above in connection with FIG. 8. The sectional view is across the section line shown in FIG. 8. In the example of FIG. 9, the disk stack has nine disks 80, but that number may vary.

Four bolts 91 (three of which are shown) run through the bolt holes 83 in the disks 80. A top plate 92 and bottom plate 93 secure the disks 80 together, using bolts 91, and provide attachments for a shaft 97b and for mounting the disk assembly 90. A threaded bushing 92a receives shaft 97b, which is hollow. As described above, the feed fluid enters the disk assembly via the hollow shaft 97b.

The annular shapes of the disks 80 and of spacers 81 define a lobed feed well 95 when the disks 80 are stacked.

Referring to both FIGS. 8 and 9, it can be seen that the thickness of both the spacers 81 and channels 82 vary. Beginning at the feed well 95, the spacers 91 become thinner toward rim 84. The channels 82 have a short ramp 82a from feed well 95, then are slightly bowl-shaped with a gradual rise toward rim 84. The thinnest portions of disk 80 are at the bottom of a "bowl" within each channel 82.

Between each disk 80 is a gap spacing disk 97. Gap spacing disks 97 have a diameter smaller than disks 80.

Figure 12:
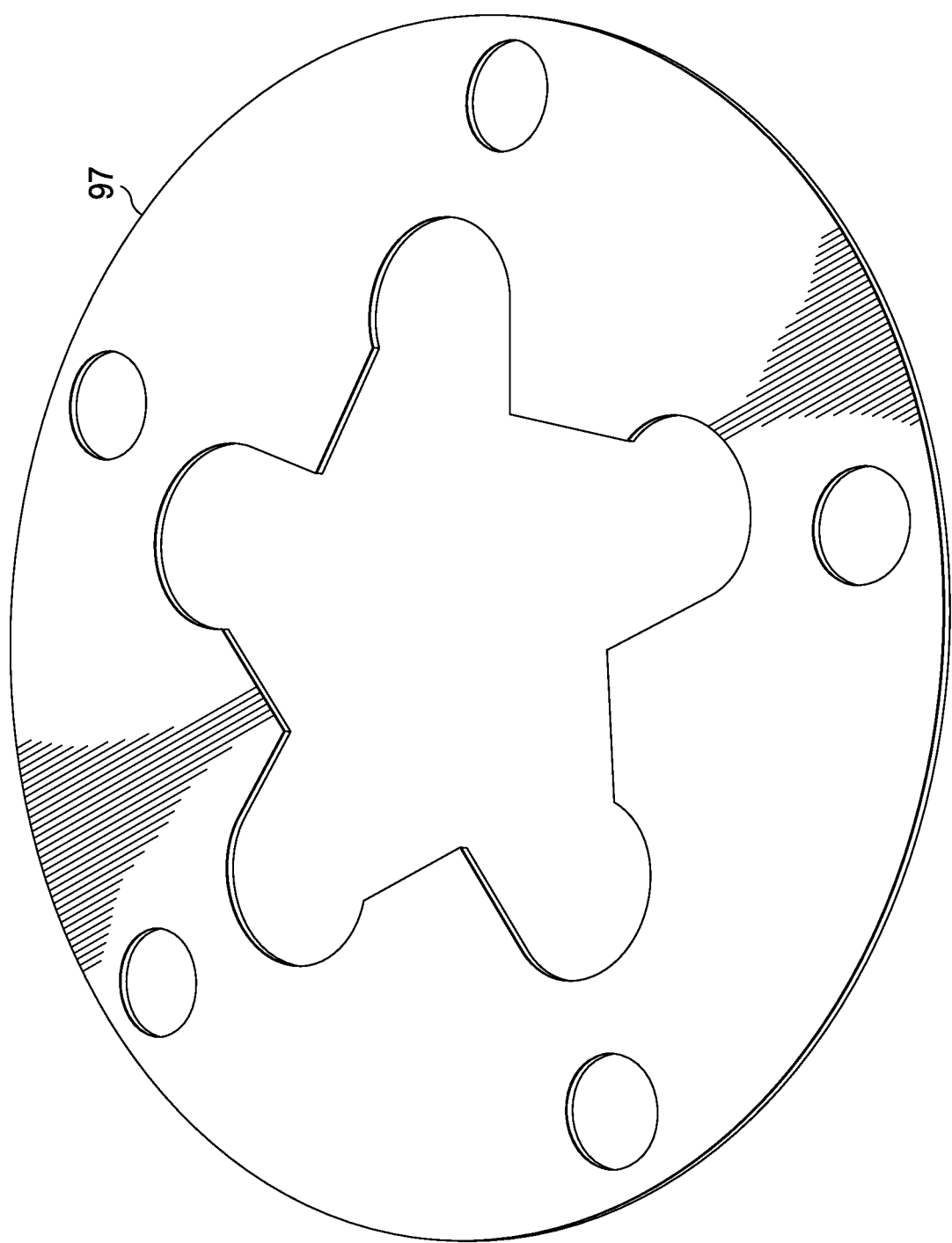

FIG. 12 illustrates one of the gap spacing disks 97. Like disks 80, gap spacing disks 97 are annular, with the same size center opening for defining the feed well and its lobes.

Gap spacing disks 97 serve a function similar to the above-described spacer disks 40A, and have similar material and size specifications.

Referring again to FIG. 9, gap spacing disks 97 provide a gap 96 between each disk. This gap 96 is present all around the entire circumference of disk 80. The exact size of this gap 96 may be influenced by the fluid being atomized. In general, gap 96 is on the order of, or thinner than, the free surface film thickness on disks 80. Gap 96 inhibits larger film thicknesses, which can arise from surface waves, from penetrating to the disk periphery.

The gap spacing disks 97 can be easily exchanged for other gap spacing disks 97 of different thicknesses and/or diameter. This allows the gap 96 between disks to be adjusted in size.

The width of rim 84 is also a design choice. A wider rim 84 results on a longer gap 96. The longer the gap 96, the more restriction of fluid.

A further feature of each disk 80 are knife edges 89 around the edge. Spinning disks atomizers typically use this type of edge, or a thinned edge, rather than a blunt flat edge. For disk 80, this edge is radiused to make edges on top and bottom. The knife edges may be toothed, as shown in FIG. 5.

Figure 10:
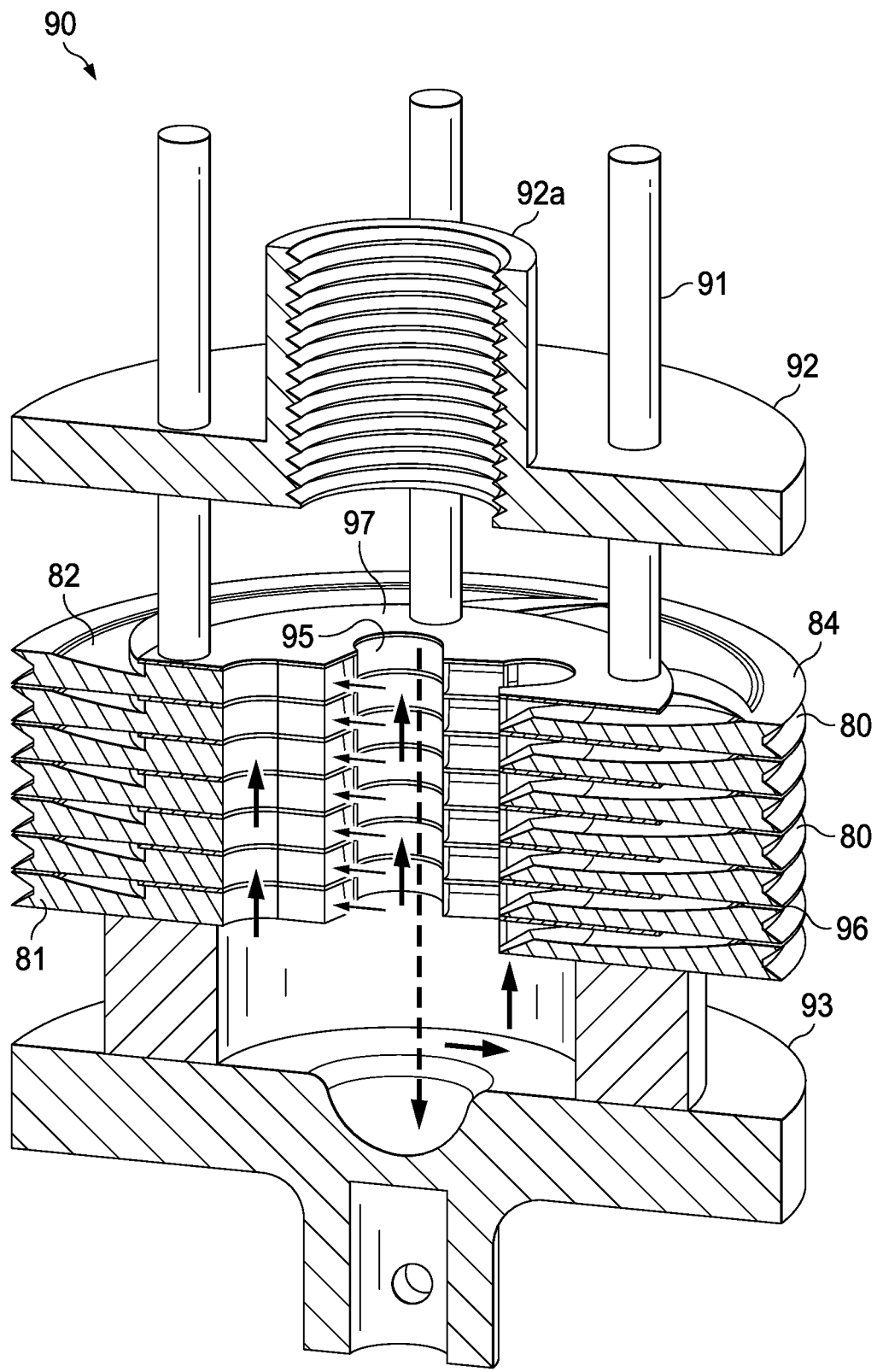

FIG. 10 illustrates the flow of feed fluid into and out of disk assembly 80. The thin dashed line represents the flow of fluid down into feed well 95. The thicker arrows represent flow up the walls of the feed well 95, including up the lobed portions of the feed well 95. The smaller arrows represent flow into the channels 82. This flow is due to the "artificial gravity" of the spinning disks.

Single Covered Disk with Circumferential Gap

Figure 11:
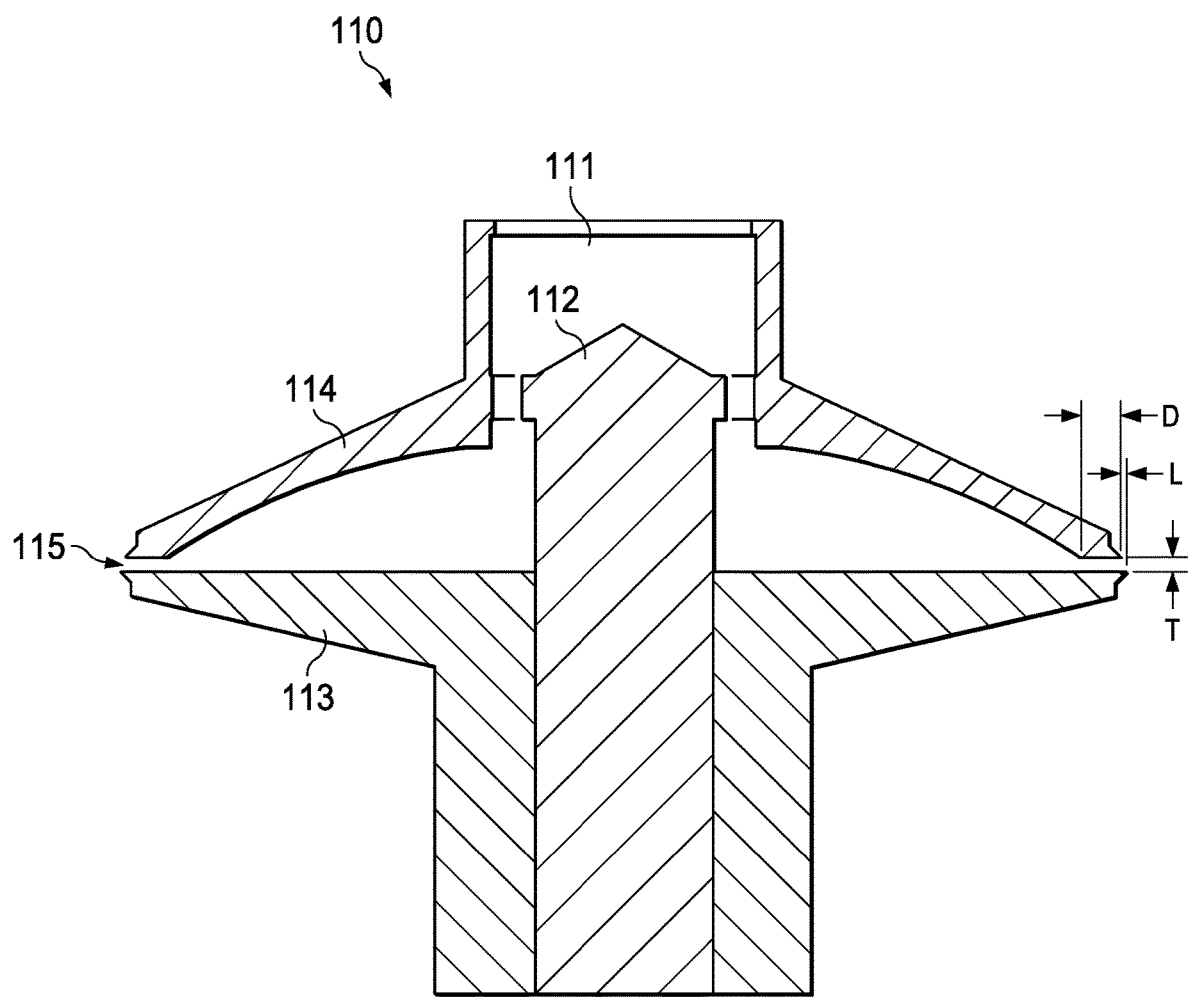

FIG. 11 illustrates a single covered disk 110, which can be used as the disk assembly in an atomizer such as is shown in FIG. 1. Disk 110 has a center feed well 111 with a inner cone 112, such as described above in connection with FIG. 2.

In operation, the flat lower disk 113 spins, together with a cover disk 114. The cover disk 114 has a dome-like shape, having more separation from lower disk 113 toward feed well 111, and less separation from lower disk 113 toward the periphery of lower disk 113. At the periphery, cover disk 114 is spaced from lower disk 113, to leave a gap (or slit) 115 between these disks, which extends around their full circumference. In a manner similar to gap 96 described above, gap 115 has both a thickness, T, and a length, L, which may be optimized for the particular fluid.

A feature of disk assembly 110 is that the thickness of gap 115 can be adjusted. Specifically, cover disk 114 may be raised or lowered, relative to lower disk 113, to increase or decrease the thickness.

A further parameter of disk assembly 110 is distance, D, the distance between the periphery of the disk cover 114 and the periphery of the lower disk 113. A larger distance D increases the contribution of a free disk surface to atomization. If distance D is zero, there is no such contribution.

The invention claimed is:

1. A multi-disk stack for use with a spinning disk assembly for atomizing or encapsulating a fluid during rotation of the disk assembly, comprising:
    a number of annular patterned disks;
    a number of annular spacing disks;
    wherein the patterned disks and the spacing disks are arranged one atop the other, with a spacing disk placed above each patterned disk;
    wherein the patterned disks and spacing disks have center openings;
    a feed well defined by the center openings of the patterned disks and the spacing disks;
    wherein each patterned disk further has a a patterned middle portion and an outer raised rim;
    wherein the patterned middle portion has a number of spacers and a number of channels, with the channels formed by varying the surface thickness of the patterned disk;
    wherein the spacing disks are planar with uniform thickness and a diameter smaller than the diameter of the patterned disks, and control distances between the patterned disks by creating circumferential gaps between the outer raised rims of the patterned disks, such that all fluid that exits the multi-disk stack exits via a flow path that is first from the feed well into the channels of the patterned disks then to the circumferential gaps to exit evenly around the entire circumference of the circumferential gaps when the disk assembly is spinning;
    wherein the channels of each disk become wider toward the raised rim of that disk, such that the flow path causes fluid to collect in front of and be altered by the raised rim and such that all fluid spills over the raised rim then exits the disk; and
    a shaft for mechanically communicating with a motor that provides rotational movement to the disk assembly.

2. The multi-disk stack of claim 1, wherein the spacers have a pinwheel geometry, each spacer being wider toward the center of the disk and gradually becoming narrower toward the rim of the patterned disk.

3. The multi-disk stack of claim 1, wherein each spacer maintains the same height as the rim.

4. The multi-disk stack of claim 1, wherein each channel has a width defined by the spacers and has a depth that is deepest toward the center of the disk and that gradually becomes less deep toward the rim of the patterned disk.

5. The multi-disk stack of claim 1, wherein each outer rim has teeth around its perimeter.

6. The multi-disk stack of claim 1, wherein each patterned disk and each spacing disk has a cut-out portion toward the center of the disk, thereby defining lobes in the feed well.

7. The multi-disk stack of claim 1, wherein the spacing disks have a predetermined thickness such that the height of each circumferential gap inhibits waves from forming on the patterned disks by a selected fluid being treated by the multi-disk stack.

8. A method of using a multi-disk stack with a spinning disk assembly for atomizing or encapsulating a fluid during rotation of the disk assembly, comprising:
    providing a multi-disk stack having a number of annular patterned disks; a number of annular spacing disks; wherein the patterned disks and the spacing disks are arranged one atop the other, with a spacing disk placed above each patterned disk; wherein the patterned disks and spacing disks have center openings; a feed well defined by the center openings of the patterned disks and the spacing disks; wherein each patterned disk further has a patterned middle portion and an outer raised rim; wherein the patterned middle portion has a number of spacers and a number of channels, with the channels formed by varying the surface thickness of the patterned disk, and wherein the channels of each disk become wider toward the raised outer rim of that disk; wherein the spacing disks are planar with uniform thickness and a diameter smaller than the diameter of the patterned disks, and control distances between the patterned disks by creating circumferential gaps between the outer raised rims of the patterned disks;

placing the multi-disk stack upon a hollow shaft that mechanically communicates with a motor that provides rotational movement to the disk assembly;

wherein the spacing disks control spacing between the patterned disks;

providing fluid into the shaft such that fluid flows from the feed well and into the channels, wherein the flow path causes fluid to collect in front of and be altered by the raised rim and such that all fluid spills over the raised rim then exits the disk evenly around the entire circumference of the circumferential gaps when the disk assembly is spinning.

* * * * *